Patented Sept. 16, 1947

2,427,539

UNITED STATES PATENT OFFICE 2,427,539

TRISAZO COPPER COMPLEXES

Walter Wehrli, Basel, Switzerland, assignor to Sandoz Ltd., Fribourg, Switzerland, a Swiss company No Drawing. Application July 6, 1942, Serial No. 449,952. In Switzerland July 14, 1941

8 Claims. (Cl. 260—145)

The present invention relates to new substantive metallized azo dyestuffs and to a process for their manufacture.

It has been found that new valuable metallized substantive azo dyestuffs can be prepared by coupling diazotized disazo dyestuffs of the formula

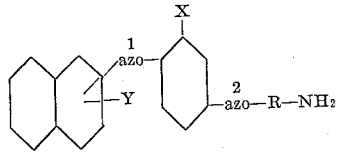

wherein X and Y stand for a substituent selected from the group consisting of hydroxy, alkoxy, acyloxy and halogen, R stands for a radical selected from the group consisting of benzene and naphthalene, and wherein Y stands in o-position to the azo group 1, whereby the disazo dyestuffs must contain at least one sulphonic acid group and may contain complex linked metal and other substituents, with suitable azo components which can also contain azo groups, and treating the polyazo dyestuffs thus obtained, insofar as they do not contain any complex linked metal, in substance or on the fibre with metallizing compounds.

In case the polyazo dyestuffs prepared according to the present invention contain diazotizable amino groups, they can be—before or after treatment with metallizing compounds—diazotized in substance or on the fibre and coupled with suitable azo components.

The complex metal compounds of the polyazo dyestuffs prepared as herein above defined may further contain groups able to link metals; in this case they can be treated with metallizing compounds in substance or when already dyed on a fibre.

The disazo dyestuffs used in the present process as starting products can be prepared in different ways. For instance one can combine first an o-hydroxy or an o-alkoxy or an o-halogen diazo naphthalene compound with a 1-hydroxy or a 1-alkoxy-3-aminobenzene derivative containing a free 6-position, further diazotizing and coupling a suitable middle component of the benzene or naphthalene series that couples in para-position to the amino group. Further the starting disazo dyestuffs can be obtained by diazotizing for instance 1-amino-2-hydroxy-4-acylaminobenzene or 1-amino-2-alkoxy-4-acylaminobenzene or 1-amino-2-halogen-4-nitrobenzene, 1-amino-2-halogen-4-acylaminobenzene, 1-amino-2-hydroxy-4-nitrobenzene or 1-amino-2-alkoxy-4-nitrobenzene and coupling these diazo compounds with a hydroxynaphthalene that can contain sulpho or carboxy groups and other substituents in such a manner, that the coupling takes place in o-position to the hydroxy group, reduction of the nitro- or saponification of the acylamino group, further the diazotation and coupling with a suitable middle component that couples in paraposition to the amino group.

In case that instead of the disazo dyestuffs their metallized derivatives are used as starting products, the treatment with the metallizing agents can be carried out already with the mono-azo dyestuffs used for their preparation or with the ready prepared disazo dyestuffs. Under the expression metallizing agents I understand substances that, when applied by usual methods on azo dyestuffs that contain groups able to link metals, transform the dyestuffs into metal complex compounds. Such metallizing agents are for example compounds of copper, nickel, cobalt, chromium, iron, vanadium, and the like which can be used as such or in mixture or as free metals.

As azo components that can be used for the coupling with the above cited diazotized disazo dyestuffs or their metal compounds can be cited the suitable coupling-able aliphatic, isocyclic or heterocyclic compounds and also the coupling-able azo dyestuffs which can contain complex linked metals.

The coupling is preferably carried out in presence of acid binding agents such as sodium carbonate, sodium acetate, chalk, calcium hydroxide, pyridine, pyridine bases and the like.

The new dyestuffs obtained according to the present invention dye cotton, linen and artificial fibres from regenerated cellulose generally in blue, grey, green and olive shades. Generally they possess an excellent affinity and give dyeings with good wet-fastness and excellent fastness to light. Some of them are very suitable for dyeing leather.

One object of the present invention is the process for the preparation of metallized substantive dyestuffs, consisting in coupling diazotized disazo dyestuffs of the herein above disclosed configuration with suitable coupling components and treating the polyazo dyestuffs thus obtained with metallizing agents.

Another object of the present invention is the process for the manufacture of metallized substantive dyestuffs consisting in coupling diazotized metallized disazo dyestuffs of the herein above defined configuration with suitable coupling components and in the case that the polyazo dyestuffs thus obtained still contain groups capable of linking metals, subjecting them to a treatment with metallizing agents.

Still another object of the present invention are on the complex metal compounds of the substantive polyazo dyestuffs of the formula

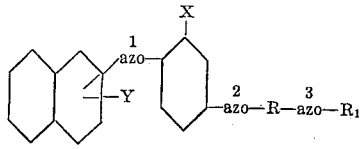

wherein X and Y stand for a substituent selected from the group consisting of hydroxy, alkoxy, acyloxy and halogen, R stands for a radical selected from the group consisting of benzene and naphthalene, $R_1$ stands for a suitable coupling-able aliphatic, isocyclic or heterocyclic compound or an azo dyestuff capable of coupling which may contain complex linked metals, and wherein Y stands in o-position to the azo group 1 and the azo-group 2 in p-position to azo group 3, which dyestuffs contain at least one sulphonic acid group and dye cellulose fibres and leather into fast blue, grey, green and olive shades.

The following examples, without being limitative, illustrate the present invention, the parts being by weight:

*Example 1*

63.7 parts of the disazo dyestuff of the formula

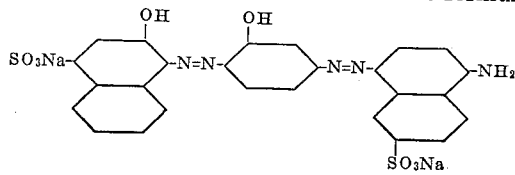

are diazotized with 6.9 parts of sodium nitrite and 25 parts of hydrochloric acid and coupled in presence of 50 parts of sodium bicarbonate and 50 parts of technical pyridine base mixture with 31.5 parts of 2-phenylamine-5-hydroxynaphthalene-7-sulphonic acid. The dyestuff thus obtained is then salted out and filtered. The precipitate is then dissolved in water and transformed into its copper derivative by treating it at elevated temperature with 25 parts of copper sulphate in presence of sodium acetate. After salting out, filtration and drying, the new dyestuff is a bronzing powder, soluble in water and possessing an excellent affinity. It dyes cotton and artificial silk from regenerated cellulose in brilliant blue shades which are very fast to light and to washing.

The transformation of the polyazo dyestuff into its copper-complex compound can, with the same success, be carried out by treating it with copper sulphate in presence of ammonia.

By using instead of the disazo dyestuff cited above similar disazo dyestuffs for the preparation of which, instead of 1-aminonaphthalene-6-sulphonic acid, 1-aminonaphthalene - 7 - sulphonic acid or the technical mixture of 1-aminonaphthalene-6-sulphonic acid and 1-aminonaphthalene-7-sulphonic acid is used and working in the manner described above, dyestuffs with similar properties will be obtained.

Similar dyestuffs will also be obtained when, instead of 2-phenylamino-5-hydroxynaphthalene-7-sulphonic acid, equivalent parts of 2(4'-methylphenyl)-amino - 5-hydroxynaphthalene- 7-sulphonic acid or 2(3'-carboxyphenyl)-amino-5-hydroxynaphthalene-7-sulphonic acid are used as azo components.

*Example 2*

69.9 parts of the copper derivative of the disazo dyestuff used in Example 1 as starting product are diazotized with 6.9 parts of sodium nitrite and 25 parts of hydrochloric acid and coupled in presence of 20 parts of sodium carbonate and 100 parts of pyridine with 31.5 parts of 2-phenylamino-5-hydroxynaphthalene-7-sulphonic acid. The dyestuff isolated in the usual way is practically identical with the dyestuff the preparation of which is described in Example 1.

*Example 3*

By using as starting product instead of the disazo dyestuff of Example 1 the disazo dyestuff of the formula

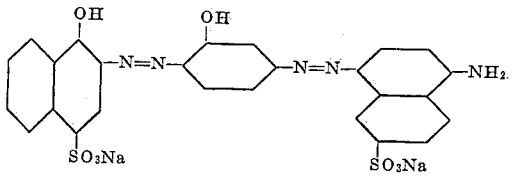

and working in the manner described in Example 1, a dyestuff will be obtained that gives fuller blue shades and possessing very good affinity and similar fastness properties.

*Example 4*

By replacing in Example 1 2-phenylamino-5-hydroxynaphthalene-7-sulphonic acid by 36.1 parts of 1-hydroxy-8-acetylaminonaphthalene-3:6-disulphonic acid and working in the manner described there, a copper-containing dyestuff dyeing leather in brilliant blue shades will be obtained.

*Example 5*

By using, instead of 2-phenylamino-5-hydroxynaphthalene-7-sulphonic acid, 23.9 parts of 2-amino-5-hydroxynaphthalene-7-sulphonic acid as azo compound, a dyestuff dyeing cotton in redder brilliant blue shades of excellent washing and light fastness and excellent affinity will be obtained.

The dyestuff thus obtained contains a diazotizable amino group. It can—before or after treatment with copper—be diazotized in substance or on the fibre and coupled with suitable azo components.

*Example 6*

69.9 parts of the copper compound of the disazo-dyestuff used as starting product in Example 1, are diazotized with 6.9 parts of sodium nitrite and 25 parts of hydrochloric acid and coupled with 44.7 parts of a monoazo dyestuff of the formula

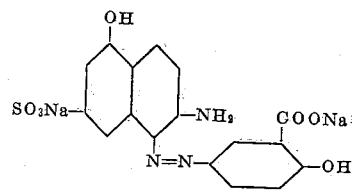

in presence of sodium bicarbonate and technical pyridine bases. The dyestuff isolated in the usual way dyes cotton in greenish grey-blue shades; the fastness of which can be increased by subsequent treatment with metal salts, especially with copper or chromium salts.

The following tables show the schemata for the preparation of further dyestuffs.

| No. | Disazo dyestuff | Azo component | Dyeing of the copper-containing dyestuff on cotton |
|---|---|---|---|
| 1. | | 2-phenylamino-5-hydroxynaphthalene-7-sulphonic acid | Blue. |
| 2. | | 2-benzoylamino-5-hydroxynaphthalene-7-sulphonic acid | Grey-blue. |
| 3. | id | 2-benzoylamino-8-hydroxynaphthalene-6-sulphonic acid | Do. |
| 4. | | 2-phenylamino-5-hydroxynaphthalene-7-sulphonic acid | Blue. |
| 5. | | 2-phenylamino-5-hydroxynaphthalene-7-sulphonic acid | Do. |
| 6. | | | Blue-grey. |
| 7. | | | Grey. |

What I claim is:

1. A process for the manufacture of a complex copper compound of a substantive polyazo dyestuff, which comprises the steps of diazotizing a disazo dyestuff of the formula

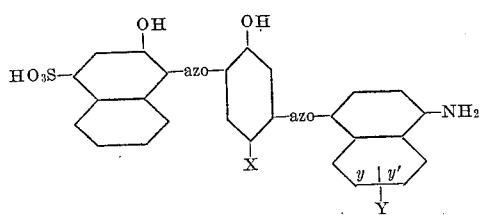

wherein X is a member selected from the group consisting of hydrogen and alkyl, and Y stands for an $SO_3H$ group in one of the positions $y$ and $y'$, coupling the resultant diazodisazo dyestuff with a component of the formula

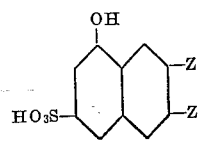

wherein one Z is a member selected from the group consisting of $-NH_2$, $-NH$-aryl and $-NH$-acyl and the other Z is hydrogen, and treating the polyazo dyestuff thus obtained with a copper-yielding agent.

2. A process for the manufacture of a complex copper compound of a substantive polyazo dyestuff, comprising the steps of diazotizing the disazo dyestuff of the formula

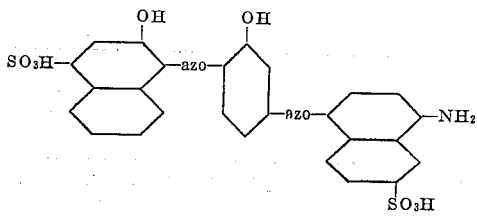

coupling it with 2-phenylamino-5-hydroxynaphthalene-7-sulphonic acid, and treating the polyazo dyestuff thus obtained with copper sulphate in presence of sodium acetate at an elevated temperature.

3. A process for the manufacture of a complex copper compound of a substantive polyazo dyestuff, comprising the steps of diazotizing the disazo dyestuff of the formula

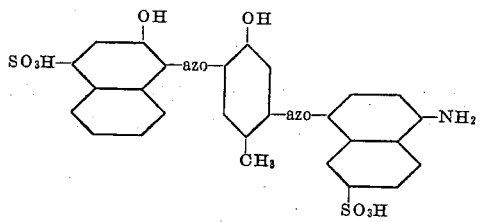

coupling it with 2-phenylamino-5-hydroxynaphthalene-7-sulphonic acid, and treating the polyazo dyestuff thus obtained with copper sulphate in presence of sodium acetate at an elevated temperature.

4. A process for the manufacture of a complex copper compound of a substantive polyazo dyestuff, comprising the steps of diazotizing the disazo dyestuff of the formula

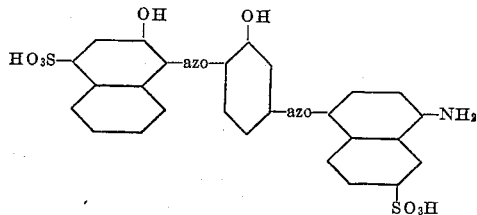

coupling it with 2-benzoylamino-8-hydroxynaphthalene-6-sulphonic acid, and treating the polyazo dyestuff thus obtained with copper sulphate in presence of sodium acetate at an elevated temperature.

5. A complex copper compound of a substantive polyazo dyestuff of the formula

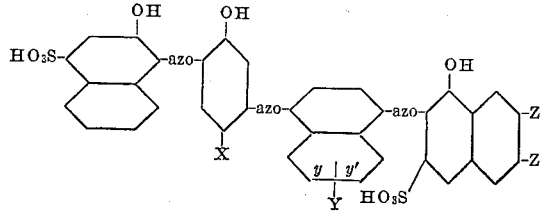

wherein X is a member selected from the group consisting of hydrogen and alkyl, Y stands for an $SO_3H$ group in one of the positions $y$ and $y'$, one Z is a member selected from the group consisting of $-NH_2$, $-NH$-aryl and $-NH$-acyl, and the other Z is hydrogen.

6. The complex copper compound of the polyazo dyestuff of the formula

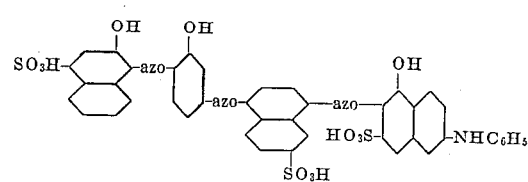

7. The complex copper compound of the polyazo dyestuff of the formula

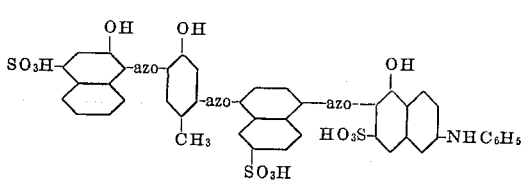

8. The complex copper compound of the polyazo dyestuff of the formula

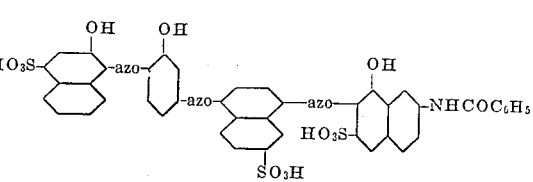

WALTER WEHRLI.

REFERENCES CITED

The following references are of record in the file of this patent:

UNITED STATES PATENTS

| Number | Name | Date |
|---|---|---|
| 2,203,196 | Hanhart | June 4, 1940 |
| 2,153,201 | Murphy et al. | Apr. 4, 1939 |
| 2,115,852 | Hannum et al. | May 3, 1938 |
| 2,257,165 | Fellmer | Sept. 30, 1941 |

FOREIGN PATENTS

| Number | Country | Date |
|---|---|---|
| 836,059 | France | Oct. 10, 1938 |
| 388,332 | Great Britain | Feb. 28, 1931 |